United States Patent
Schiergl

(10) Patent No.: US 9,393,965 B2
(45) Date of Patent: Jul. 19, 2016

(54) METHOD FOR OPERATING A DRIVETRAIN OF A MOTOR VEHICLE HAVING A FREE-WHEELING ENGINE-OFF FUNCTION, CONTROL DEVICE AND MOTOR VEHICLE

(71) Applicant: Audi AG, Ingolstadt (DE)

(72) Inventor: Andreas Schiergl, Schierling (DE)

(73) Assignee: AUDI AG, Ingolstadt (DE)

( * ) Notice: Subject to any disclaimer, the term of this patent is extended or adjusted under 35 U.S.C. 154(b) by 8 days.

(21) Appl. No.: 14/396,998

(22) PCT Filed: Apr. 22, 2013

(86) PCT No.: PCT/EP2013/001193
§ 371 (c)(1),
(2) Date: Oct. 24, 2014

(87) PCT Pub. No.: WO2013/159896
PCT Pub. Date: Oct. 31, 2013

(65) Prior Publication Data
US 2015/0119196 A1    Apr. 30, 2015

(30) Foreign Application Priority Data
Apr. 27, 2012    (DE) .......................... 10 2012 008 632

(51) Int. Cl.
*B60W 30/18*    (2012.01)
*B60W 30/192*    (2012.01)
(Continued)

(52) U.S. Cl.
CPC ............. *B60W 30/192* (2013.01); *B60W 10/06* (2013.01); *B60W 10/10* (2013.01); *B60W 10/113* (2013.01);
(Continued)

(58) Field of Classification Search
CPC ................ B60W 2710/0655; B60W 30/18072
See application file for complete search history.

(56) References Cited

U.S. PATENT DOCUMENTS 4,665,777 A * 5/1987 Kikuchi .............. F16H 61/0437
477/114
6,151,978 A    11/2000 Huber
(Continued)

FOREIGN PATENT DOCUMENTS

CN    101598214    12/2009
CN    101767587    7/2010
(Continued)

OTHER PUBLICATIONS

International Search Report issued by the European Patent Office in International Application PCT/EP2013/001193.
(Continued)

*Primary Examiner* — Sherry Estremsky
(74) *Attorney, Agent, or Firm* — Henry M. Feiereisen LLC

(57) ABSTRACT

A method for operating a drive train of a motor vehicle with an internal combustion engine, automatic transmission and at least one drive axle, is disclosed wherein in order to save fuel during the driving mode when the accelerator pedal is not activated a clutch device which is associated with the automatic transmission is opened and subsequently the internal combustion engine is shut down. When the accelerator pedal is activated again the internal combustion engine is started and in the automatic transmission the highest possible gear speed for the reconnection is firstly selected and so that the revving up time of the engine rotational speed is as short as possible, with the result that the necessary drive torque which is generated by the internal combustion engine can be made available at the drive axle as quickly as possible.

7 Claims, 1 Drawing Sheet

(51) Int. Cl.
  *B60W 10/06* (2006.01)
  *B60W 10/10* (2012.01)
  *B60W 10/113* (2012.01)
(52) U.S. Cl.
  CPC . *B60W 30/18072* (2013.01); *B60W 2030/1809* (2013.01); *B60W 2540/10* (2013.01); *B60W 2710/1005* (2013.01); *Y02T 10/48* (2013.01); *Y10T 477/6403* (2015.01); *Y10T 477/656* (2015.01); *Y10T 477/689* (2015.01)

(56) References Cited

U.S. PATENT DOCUMENTS

| | | | | |
|---|---|---|---|---|
| 8,439,801 | B2 * | 5/2013 | Preisner | B60W 10/02 477/77 |
| 8,747,280 | B2 * | 6/2014 | Hoshiba | B60W 10/06 477/115 |
| 2010/0151991 | A1 | 6/2010 | Mair et al. | |
| 2011/0054765 | A1 | 3/2011 | Lewis et al. | |
| 2011/0203860 | A1 | 8/2011 | Sauvlet et al. | |
| 2014/0114542 | A1 * | 4/2014 | Abdul-Rasool | B60W 10/02 701/65 |
| 2015/0307102 | A1 * | 10/2015 | Mitsuyasu | B60W 30/18172 701/48 |

FOREIGN PATENT DOCUMENTS

| | | |
|---|---|---|
| CN | 102001335 | 4/2011 |
| DE | 102 21 701 | 11/2002 |
| DE | 10 2007 012 875 | 9/2008 |
| DE | 10 2007 050 659 | 4/2009 |
| DE | 10 2010 052 385 | 6/2011 |
| DE | 10 2010 008 726 | 8/2011 |
| DE | 10 2010 003 673 | 10/2011 |
| DE | 10 2010 024 045 | 12/2011 |
| DE | 10 2010 031 036 | 1/2012 |
| WO | WO 2007/102420 | 9/2007 |
| WO | WO 2010/009943 | 1/2010 |

OTHER PUBLICATIONS

Chinese Search Report issued on Apr. 5, 2016 with respect to counterpart Chinese patent application 2013800222477.
Translation of Chinese Search Report issued on Apr. 5, 2016 with respect to counterpart Chinese patent application 2013800222477.

* cited by examiner

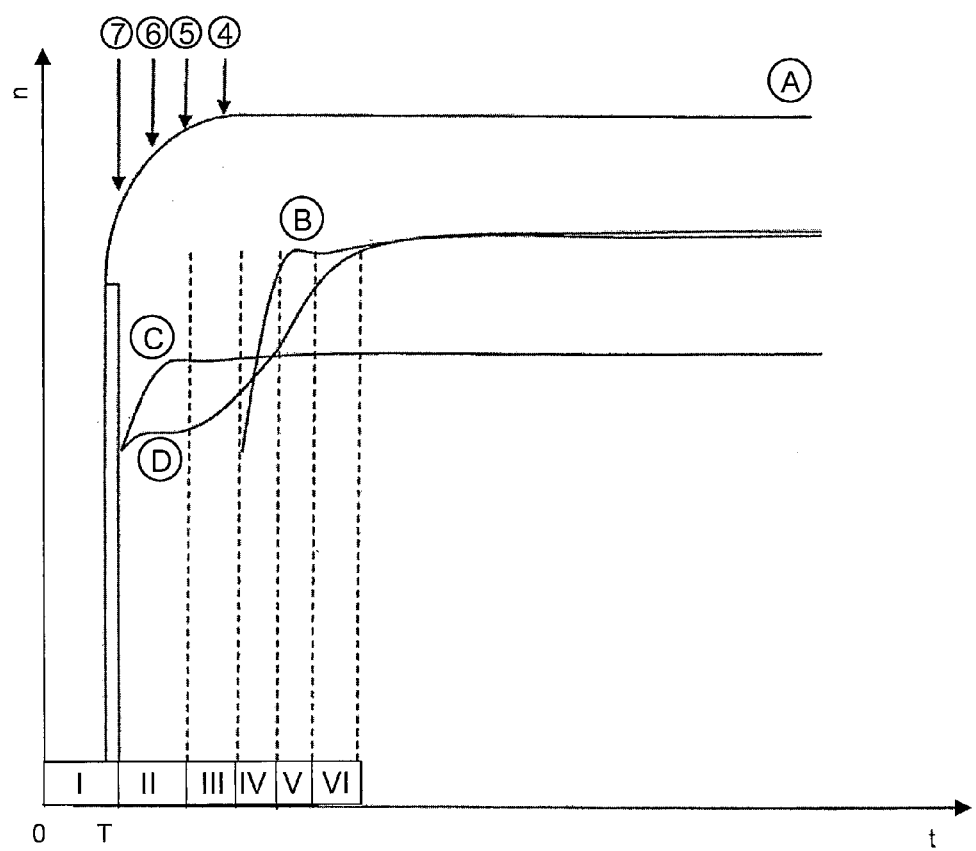

METHOD FOR OPERATING A DRIVETRAIN OF A MOTOR VEHICLE HAVING A FREE-WHEELING ENGINE-OFF FUNCTION, CONTROL DEVICE AND MOTOR VEHICLE

CROSS-REFERENCES TO RELATED APPLICATIONS

This application is the U.S. National Stage of International Application No. PCT/EP2013/001193, filed Apr. 22, 2013, which designated the United States and has been published as International Publication No. WO 2013/159896 and which claims the priority of German Patent Application, Serial No. 10 2012 008 632.6, filed Apr. 27, 2012, pursuant to 35 U.S.C. 119(a)-(d).

BACKGROUND OF THE INVENTION

The invention relates to a method for operating a drivetrain of a motor vehicle with internal combustion engine, automatic transmission and at least one drive axle, wherein for saving fuel during driving operation a clutch, which belongs to the automatic transmission, is disengaged when the drive pedal or gas pedal is not actuated and subsequently the internal combustion engine is turned off.

The invention also relates to a control device and a motor vehicle.

From DE 10 2010 008 726 A1 a method for operating a drive system of a motor vehicle with automatic twin clutch transmission and hybrid drive with internal combustion engine and electric motor is known. DE 10 2010 008 726 A1 describes how to most comfortably but also dynamically restart the internal combustion engine during driving operation after the internal combustion engine has been turned off or shut down.

As a measure for saving fuel in motor vehicles, in particular those including an automatic twin clutch transmission, the internal combustion engine can be turned off during driving operation under certain circumstances, for example when the driver does not actuate the gas pedal (so-called free-wheeling engine-off function" or a so-called "Start-Stop-Sailing"). In the free-wheeling engine-off" operating mode the active drive clutch of the twin clutch transmission is first disengaged and subsequently the internal combustion engine is turned off, which represents a further development of the operating mode referred to as "sailing", in which the clutch is released and the internal combustion engine transitions into the idling, as soon as the gas pedal is not actuated.

In the free-wheeling engine-off function the internal combustion engine has to be started and power transmission to a drive axle be established as soon as possible when the driver actuates the gas pedal again in order to quickly reestablish the forward drive. The invention is based on the object to provide possibilities how this can be accomplished.

SUMMARY OF THE INVENTION

The object is solved with a method according to the invention for operating a drive train of a motor vehicle with an internal combustion engine, an automatic transmission and at least one drive axle, wherein for the purpose of saving fuel during the driving operation when the gas pedal or drive pedal is not actuated a clutch device which belongs to the automatic transmission is disengaged and subsequently the internal combustion engine is turned off, wherein when the drive pedal is actuated again (during the driving operation by the driver) the internal combustion engine is started and a highest possible gear, in particular the constructed the constructively defined highest possible gear, is selected in the automatic transmission for connecting or reconnecting (the internal combustion engine to the drive axle). This reduces the run-up time of the rotational speed of the motor to a minimum so that a required drive torque generated by the internal combustion engine is available on the drive axle within a short period of time.

A high gear is understood as a gear stage or driving stage of the automatic transmission, having a low transmission ratio. A low gear is understood to as a gear stage of the automatic transmission, having a high transmission ratio.

In summary, the invention involves the following: when the motor vehicle is in the so-called free-wheeling engine-off operating mode or in the so-called start-stop-sailing operating mode, the drive torque is to be available as fast as possible when the drive torque is requested again by actuating the drive pedal or the gas pedal. To this end the internal combustion engine is first started. For reconnecting the internal combustion engine to the drive axle a highest possible gear or a high gear stage is initially selected in the automatic transmission because this causes the rotational speed of the internal combustion engine to quickly increase to a synchronous rotational speed (which will be defined in more detail below).

Preferably the automatic transmission is an automatic twin clutch transmission (in the following only referred to as twin clutch transmission). Such a twin clutch transmission consists of two sub-transmissions, each having a clutch device and a defined number of gears or gear stages. A twin clutch transmission allows gearing up from a lower gear into higher gears quickly and without interruption of the traction force due to clutch switching. The clutch switching under load can also be used for accelerating the internal combustion engine. In certain gear combinations this can also be accomplished with conventional stepped automatic transmissions.

Further preferably the engaging of a high gear and the starting of the internal combustion engine occur substantially simultaneously, i.e., in order to save time it is advantageous to carry out two actions at the same time, i.e., engaging an appropriate high gear and the starting or restarting of the internal combustion engine and a fast acceleration of the internal combustion engine to the required synchronous rotational speed. When these two actions are correspondingly performed the assigned clutch device can be engaged without jolts and the drive torque is then available at the drive axle.

When after reconnection (of the internal combustion engine to the drive axle) a higher drive torque is required on the drive axle (for example due to the detected drive pedal position) a low or lower gear can immediately be engaged in the automatic transmission, which provides such a higher torque more or less instantaneously on the drive axle.

Preferably, prior to reconnecting the internal combustion engine to the drive axle, the internal combustion engine is reproducibly brought by the automatic transmission to a gear-dependent synchronous rotational speed (synchronous rotational speed=product of output rotational speed and transmission ratio).

The object is also solved with the features of a first alternative independent claim which sets forth a control device or an open loop and/or closed loop control device for the drive train of a motor vehicle, wherein this control device is configured for implementing the method according to the invention, in particular by way of a software code stored in the control device. With a second alternative independent claim the solution of the object also includes a motor vehicle wherein this is in particular a passenger car which has an internal combustion engine, an automatic transmission (in particular a twin clutch automatic transmission) at least one drive axle and at least such a control device.

The procedures described in the following on one hand ensure a long rolling of the motor vehicle in the free-wheeling engine-off operating mode by reducing the drag torque and on the other hand a fast restoration of the forward drive from the free-wheeling engine-off operating mode (as explained above).

In order for enabling the corresponding motor vehicle to roll as long as possible in the free-wheeling engine-off operating mode the goal has to be to reduce the occurring driving resistances. The aerodynamic drag of the motor vehicle and the rolling resistance of the tires cannot be influenced, however the drag torques, which occur in the automatic transmission and in the braking system can be influenced.

The drag torque in the automatic transmission can be reduced through appropriate configuration of the gear stages and by ventilated clutch devices. Further the drag torque in the free-wheeling engine-off operating mode can be reduced by switching the automatic transmission into a neutral position (in which the motor vehicle rolls neutrally), which counteracts the adverse effect of the drag torque, which in particular applies also to a twin clutch transmission. Further the rolling behavior of the motor vehicle can also be improved in that through appropriate measures the braking pads on the motor vehicle operating brakes are opened far enough or cooled, which lowers and in particular eliminates the drag torque in the braking system.

In order for the free-wheeling engine-off function explained above to be accepted by the user or the driver, it has to be ensured that the delay or the time period between the re-actuation of the gas pedal and a perceptible forward drive is as short as possible. This is achieved inter alia in that the internal combustion engine can transfer a drive torque to the drive axle via the automatic transmission and via the clutch device at an earliest possible time point after the restart.

To this end a high gear with a low rotational speed has to be first engaged in an automatic transmission (in case of a twin clutch transmission in one of the sub-transmissions) with a low synchronous rotational speed (mathematical product of drive rotational speed and transmission ratio) so that the run-up time of the engine rotational speed is as short as possible. After the restart of the internal combustion engine the internal combustion engine has to be brought to the synchronous rotational speed. This is accomplished reproducibly via a target rotational speed interface between the twin clutch transmission and the internal combustion engine. This renders the initial adjustment of the engine rotational speed independent of the time period required for the engagement of the gear and engagement of the clutch device of the automatic transmission or the twin clutch transmission.

Only when the engine rotational speed of the internal combustion engine has reached or exceeded the synchronous rotational speed a drive torque for the drive of the motor vehicle can be transmitted from the internal combustion engine to the drive axle by engaging the associated clutch device.

When a drive torque is transmitted via the engaged clutch device when the engine rotational speed is still far below the synchronous rotational speed of the engaged gear the inertial mass of the internal combustion engine would be accelerated which leads to a deceleration of the motor vehicle and with this to a perceptible jolt. Therefore time is allowed to elapse until the rotational speed of the internal combustion engine has reached the synchronous rotational speed of the desired gear, before closing the corresponding clutch device and the torque is transmitted to the drive axle for accelerating the vehicle. For this purpose it is useful to engage a highest possible gear as explained above.

When the driver desires a stronger acceleration when re-actuating the gas pedal for terminating the free-wheeling engine-off phase, the automatic transmission has to provide a small gear. This is for example achieved in that immediately after the first connection of the internal combustion engine to the drive axle, which occurs while a high gear (intermediate gear) is engaged, engagement back into a lower gear is initiated. In a twin clutch transmission this can be accomplished in that first the desired gear is engaged in another sub-transmission and the rotational speed of the internal combustion engine is adjusted to the synchronous rotational speed of the smaller gear with the clutch device belonging the sub-transmission with the higher gear. This adjustment occurs via the ratio between the engine rotational speed and the torque transmitted by the clutch device. Because during the adjustment procedure the transmitted torque can already be by increased before the engine rotational speed has reached the high synchronous rotational speed of the small gear, the vehicle is accelerated sooner.

On the other hand attempting to bring the rotational speed of the internal combustion engine to the high synchronous rotational speed of the small gear, without utilizing the high intermediate gear, requires waiting before closing the clutch device. This leads to an undesired downtime between the actuation of the gas pedal and a perceptible acceleration of the vehicle. The advantage of this connection strategy with intermediate gear (i.e. connection to a high intermediate gear from the state "free-wheeling engine-off" and subsequent switching back into a lower gear matching the driving strategy) is that the "down time" between stepping on the gas pedal and vehicle acceleration is shortened.

BRIEF DESCRIPTION OF THE DRAWING

In the following the invention is described exemplary in more detail with reference to the sole FIGURE. Further features and advantageous will become apparent form this description. Concrete features may hereby represent general features of the invention and features connected with other features may also represent individual features of the invention.

FIG. 1 schematically shows the sequence during connection of the internal combustion engine on a motor vehicle with "free wheeling engine off" function.

DETAILED DESCRIPTION OF PREFERRED EMBODIMENTS

In the diagram shown in FIG. 1 the horizontal axis t is the time axis. The vertical axis indicates the engine rotational speed. 4, 5, 6 and 7 designate gears or gear stages of the automatic transmission. The curve indicated with the letter A represents the gas pedal value (drive pedal value). The curve indicated with the letter B represents the synchronous rotational speed for the gear 4. The curve indicated with the letter C represents the synchronous rotational speed for the gear 7. The curve indicated with the letter D represents the engine rotational speed. I-IV indicate different phases during reconnection of the internal combustion engine as explained below.

At the time point 0 the gas pedal is not actuated. The motor vehicle is in a free-wheeling engine-off operating mode, as described above. At the time point T the drive pedal is actuated again by the driver, which is detected via a drive pedal detection (phase I).

Subsequent thereto a highest possible gear, the constructively defined highest possible gear 7, is selected for the automatic transmission by a control device. This gear 7 is subsequently engaged, wherein gear 7 is only an intermediate gear. At the same time or shortly prior thereto the internal combustion engine is started (Phase II).

Thereafter the clutch device belonging to the automatic transmission is partially closed. The engine rotational speed of the internal combustion engine is adjusted according to a target speed set by the target rotational speed interface until reaching a synchronous rotational speed. Up to phase III the drive pedal can still be analyzed to determine a smaller target gear.

This procedure can be monitored and in particular also regulated by a target rotational speed interface. When the synchronous rotational speed is reached, the engagement of a smaller target gear (gear 4) is prepared (Phase IV).

Subsequently, the smaller target gear, in this case gear 4, is engaged, wherein a rotational speed regulation to the synchronous rotational speed which is higher for this gear, occurs by the clutch device (Phase V).

Subsequently the clutch device is fully closed, whereafter the drive torque provided by the internal combustion engine is transmitted to the drive axle via the automatic transmission and its associated clutch device (Phase VI).

The following is a summary of the phases I to VI explained above:

I drive pedal analysis and gear determination (high gear/intermediate gear)
II gear engagement/engine start
III clutch engagement
IV end of rotational speed regulation by target synchronous speed/start engagement of target gear
V engagement of target gear/rotational speed regulation by engagement of target gear
VI torque transmission to the clutch of the target gear.

The invention claimed is:

1. A method for operating a drive train of a motor vehicle with internal combustion engine, automatic transmission and at least one drive axle, comprising:
    opening a clutch device which belongs to the automatic transmission when a drive pedal of the motor vehicle is not actuated;
    after opening the clutch device turning off the internal combustion engine; and
    when re-actuating the drive pedal, engaging a highest possible gear in the automatic transmission for reconnecting the internal combustion engine to the drive axle and starting the internal combustion engine simultaneous with the engaging of the highest possible gear.

2. The method of claim 1, wherein the automatic transmission is an automatic twin clutch transmission.

3. The method of claim 1, wherein the automatic transmission is an automatic twin clutch transmission, and wherein the highest possible gear is engaged in a first sub-transmission of the twin clutch transmission, the method further comprising when a higher torque on the drive axle is requested immediately engaging a target gear lower than the highest possible gear by engaging the target gear in a second sub-transmission of the twin clutch transmission and adjusting a speed of the internal combustion engine with the first sub-transmission to a synchronous speed of the target gear.

4. The method of claim 1, further comprising prior to the reconnecting of the internal combustion engine to the drive axle, reproducibly bringing the internal combustion engine to a gear-dependent synchronous rotational speed via a target rotational speed interface.

5. A control device for the drive train of a motor vehicle, said motor vehicle comprising an internal combustion engine, automatic transmission and at least one drive axle, said control device is being configured for
    opening a clutch device which belongs to the automatic transmission when a drive pedal of the motor vehicle is not actuated;
    after opening the clutch device turning off the internal combustion engine; and
    when re-actuating the drive pedal, engaging a highest possible gear in the automatic transmission for reconnecting the internal corn bustion engine to the drive axle and starting the internal combustion engine simultaneous with the engaging of the highest possible gear.

6. A motor vehicle, comprising an internal combustion engine, an automatic transmission, at least one drive axle and the control device of claim 5.

7. The motor vehicle of claim 6, constructed as a passenger car.

* * * * *